E. BOWKER.
POTATO PLANTER.
APPLICATION FILED NOV. 15, 1912.

1,079,102.

Patented Nov. 18, 1913.

Witnesses:
T. Colson
C. E. Vessels.

Inventor:
Ernest Bowker,
By Joshua R. H. Potts
his Attorney.

UNITED STATES PATENT OFFICE.

ERNEST BOWKER, OF COTTAGE GROVE, WISCONSIN, ASSIGNOR OF ONE-HALF TO JOHN E. MELLISH, OF COTTAGE GROVE, WISCONSIN.

POTATO-PLANTER.

1,079,102.

Specification of Letters Patent.   Patented Nov. 18, 1913.

Application filed November 15, 1912.   Serial No. 731,496.

*To all whom it may concern:*

Be it known that I, ERNEST BOWKER, a citizen of the United States, and a resident of the city of Cottage Grove, county of Dane, and State of Wisconsin, have invented certain new and useful Improvements in Potato-Planters, of which the following is a specification.

My invention relates to potato planters and the object of this improvement is to provide a simple and effective device of this character which will permit of manually feeding the seed from the seed hopper to the dropping plates thereby insuring the required number of seeds to be dropped at each dropping period.

Other objects will appear hereinafter.

The invention consists in the combinations and arrangements of parts hereinafter described and claimed.

The invention will be best understood by reference to the accompanying drawings forming a part of this specification, and in which—

Figure 1:
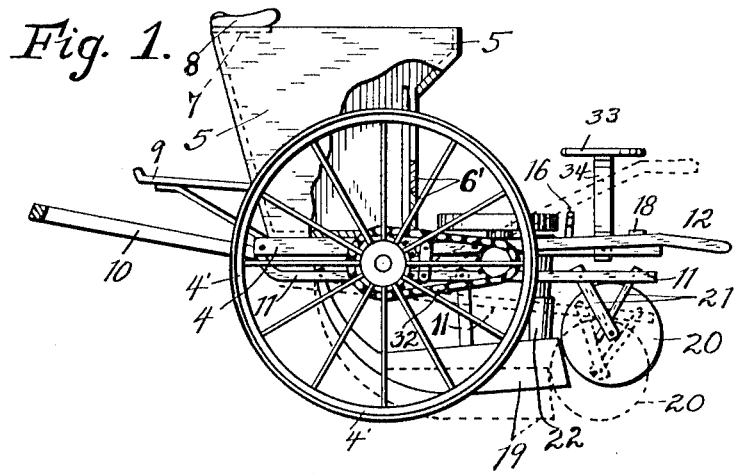
Figure 2:
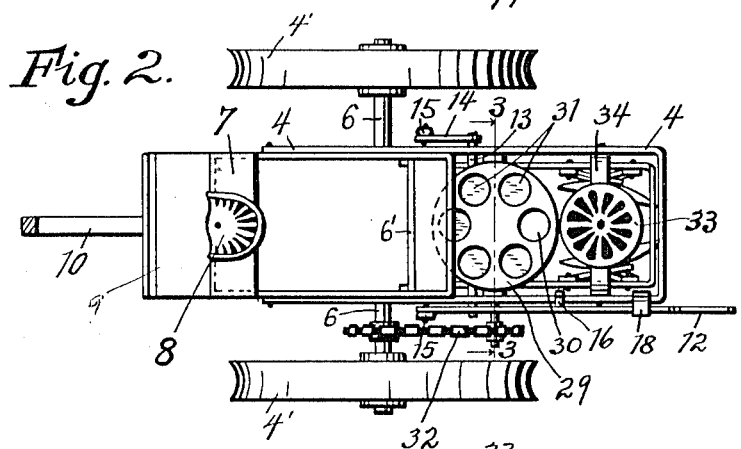
Figure 3:
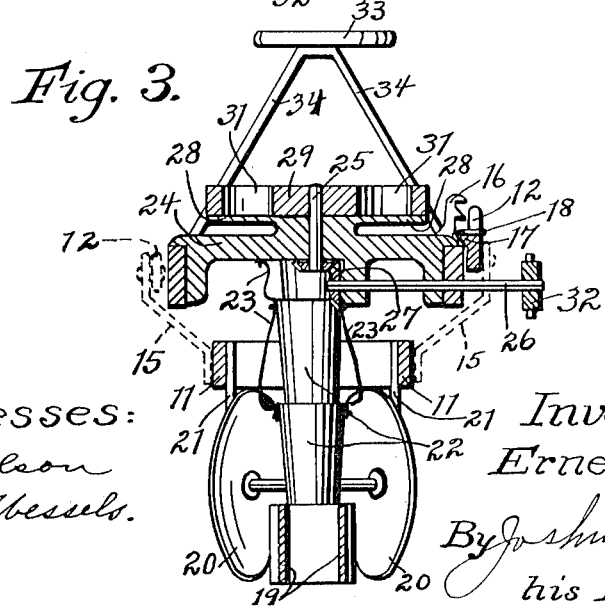

Figure 1 is a side elevation, with a part in section, of a potato planter embodying my invention, Fig. 2 is a plan view of the same, and Fig. 3 is an enlarged section taken on line 3—3 of Fig. 2.

The preferred form of construction as illustrated in the drawings comprises a main frame 4 supported on wheels 4' and an axle 6. Carried on the front portion of the frame 4 is a seed hopper 5. The rear portion of the seed hopper 5 is provided with a plurality of movable sections 6' which are adapted to be taken out or moved so that the operator may easily reach the seed which will be contained in the hopper. On the front portion of the hopper 5 is secured a member 7 across its upper side and a seat 8 is secured thereto for the driver. On the lower front portion of the hopper 5 is a foot board 9 arranged in convenient position for the driver. A tongue 10 is provided for guiding the device and to which horses or other animals are hitched to propel the machine.

Hinged to the front portion of the frame 4 is a sub-frame 11 which is adapted to be adjusted toward and away from the main frame 4 by means of a lever 12. Said lever 12 is fulcrumed on a shaft 13 which extends across the main frame 4. Opposite the lever 12 is a short lever 14 and the sub-frame 11 is pivotally connected to said levers by means of connecting links 15, one being disposed on each side of the frames as clearly illustrated by the dotted lines in Fig. 3. A catch 16 having a plurality of notches is secured on the frame 4 to coöperate with a point 17 on the lever 12 to permit of the sub-frame 11 being held at different heights in operative position. A second catch 18 is also carried by a frame 4 and adapted to engage the lever 12 to maintain the sub-frame 11 in operative position. The inoperative position of sub-frame 11 is shown in full lines in Figs. 1 and 3 and by the dotted lines in Fig. 1 in its operative position.

The furrow making shovel 19 is carried by the sub-frame 11 and adapted to open the ground to make a place for the seed to be dropped. Two dish-shaped disks 20 are also carried by the sub-frame 11 by means of the members 21, in such positions as will cover the furrow made by the shovel 19. A telescoping chute 22 is provided between the dropping plate and the top of the shovel 19 to guide the seed to said shovel after being dropped through said dropping plate. The chute 22 is composed of sections telescoped together and provided with tying straps 23 which maintain such sections in operative positions as clearly shown.

A casting 24 is carried by the main frame 4 just back of the seed hopper 5 and is provided with bearings in which are journaled shafts 25 and 26. The shafts 25 and 26 are connected together by means of beveled gears 27 to cause simultaneous rotation. The casting 24 is provided with a plate member 28 on its top portion upon which is mounted the dropping plate 29. Said dropping plate 29 is secured on the shaft 25 to turn therewith. A perforation 30 is formed in the plate 28 in registration with the telescoping chute 22 and adapted to successively register with a plurality of perforations 31 in the dropping plate 29 upon rotation of such plate. The shaft 26 is operatively connected to the axle 6 by means of an endless chain connection 32 to be driven by the wheels 4'. A seat member 33 is supported on a suitable support 34 to accommodate the operator for feeding the seed from the hopper 5 to the dropping plate 29.

In operation the device is propelled by horses or other suitable animals and driven by a driver from the driving seat. An operator occupies the seat member 33 and manually moves seeds from the hopper into the openings 31 in the dropping plate 29, placing one or more seeds in each perforation 31 as may be desired. The sections 6' in the back of the seed hopper 5 are removable to facilitate taking the seed from said hopper as will be clearly understood by those familiar with this art. By means of the lever 12 the operator adjusts the furrow making shovel 19 and covering disks 20 to desired positions to plant the potatoes at desired depths. Upon the machine moving forward the driving wheels 4' cause the dropping plate 29 to bring its perforations 31 in registration with the perforation 30 in the plate 28 allowing the seed placed in the perforations in the dropping plate 29 to be passed through the chute 22 and dropped in the furrow and covered automatically. In machines of this character which are now in use, devices are furnished for automatically feeding seed from the hopper to the dropping mechanism but since potatoes are always cut in various sizes for seed such devices vary the number of seeds dropped at each time so that they are not desirable. This device is furnished to meet a demand for a machine which will drop the desired number of seeds each time.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A potato planter comprising a frame; wheels supporting said frame; a disk having a perforation therein; outwardly and downwardly extending arms formed integrally with said disk and secured to the sides of said frame; a perforated dropping plate rotatably mounted on said disk; a vertical shaft journaled in said disk and carrying said dropping plate at its upper end; a horizontal shaft journaled in one arm of said disk; meshing gears on said shafts operatively connecting the latter; and an operative connection between said horizontal shaft and said wheels, substantially as described.

In testimony whereof I have signed my name to this specification in the presence of two subscribing witnesses.

ERNEST BOWKER.

Witnesses:
JAS. FLYNN,
D. S. MOE.

---

Copies of this patent may be obtained for five cents each, by addressing the "Commissioner of Patents, Washington, D. C."